United States Patent [19]

Oda et al.

[11] Patent Number: 4,695,983

[45] Date of Patent: Sep. 22, 1987

[54] CALCULATOR OR POCKET COMPUTER WITH SELECTABLE OPERATIONAL SEQUENCE

[75] Inventors: Koichi Oda, Sakai; Koichi Hatta, Yamatokoriyama; Toshihiko Sumitani, Nara, all of Japan

[73] Assignee: Sharp Kabushiki Kaisha, Osaka, Japan

[21] Appl. No.: 614,135

[22] Filed: May 25, 1984

[30] Foreign Application Priority Data

May 30, 1983 [JP] Japan .................................. 58-97341
May 30, 1983 [JP] Japan .............................. 58-83072[U]

[51] Int. Cl.⁴ ............................................. G06F 3/02
[52] U.S. Cl. .................................... 364/709; 364/710
[58] Field of Search ................................ 364/709, 710

[56] References Cited

U.S. PATENT DOCUMENTS

| | | | |
|---|---|---|---|
| 3,996,562 | 12/1976 | Reach et al. | 364/709 |
| 4,053,753 | 10/1977 | Sado et al. | 364/709 |
| 4,208,720 | 6/1980 | Harrison | 364/709 |
| 4,263,658 | 4/1981 | Fujita | 364/709 |
| 4,302,816 | 11/1981 | Yamamoto | 364/709 |
| 4,481,598 | 11/1984 | Ishiwata | 364/710 |

*Primary Examiner*—David H. Malzahn
*Attorney, Agent, or Firm*—Birch, Stewart, Kolasch & Birch

[57] ABSTRACT

A compact-size computer such as a functional calculator or a pocket computer selects either the sequential operation mode or formula memory mode according to the purpose of arithmetic operations and promotes faster and easier key operations. Specifically, it is substantially a calculator capable of executing formula calculations with different operational sequences wherein it comprises means for selecting and designating either the sequential operation mode that sequentially executes formula calculations according to individual key operations, or formula memory operation mode that executes operations after entry of the sequential operation mode.

2 Claims, 6 Drawing Figures

CALCULATOR OR POCKET COMPUTER WITH SELECTABLE OPERATIONAL SEQUENCE

BACKGROUND OF THE INVENTION

The present invention relates to a selectable operational sequence system that selects a specific operational sequence according to the purpose of the arithmetic operation prior to the execution.

Conventionally, there are two kinds of arithmetic operations made available, i.e., a method called formula memory operation, which first inputs all the designated arithmetic formulas before executing operations in accordance with the preferential sequence of the designated operations (for example, both the multiplication and division precede the addition and subtraction with the priority given to the calculation of formulas in parenthesis), and the other method called sequential operation mode, which executes the designated operations by sequentially designating formulas according to the sequential key operations.

The former method has been widely made available, for example, by pocket computers and advanced functional calculators. This method smoothly inputs the designated data according to the established formula, for example, such as SIN30, and yet, after entry of the designated formulas, incorrectly input data can be conveniently corrected as an advantage. The latter method has also been widely made available, for example, by a variety of electronic calculators and functional calculators. This method conveniently allows the operator to check the interim results of the formulas as required.

Nevertheless, since both of these methods employed by conventional calculators have been destined to strictly abide by either of such proper means, operators have been obliged to choose either of these methods when executing the designated formulas according to the purposes of the operations.

OBJECT AND SUMMARY OF THE INVENTION

The present invention primarily aims at solving the above-mentioned problem. More particularly, it aims at providing such calculators that enable the operators to optionally select and designate any specific operations according to their purposes of executing arithmetic operations by effectively applying advantages obtainable from both the sequential operation method and the formula memory operation method.

Another object of the present invention is to provide such a calculator that can, for example, reduce the number of finger operations needed for activating keys by effectively combining both the sequential operation and formula memory operation methods in order that the operations can be easily and quickly executed by the operator any time.

A preferred embodiment of the present invention provides means for allowing the operator to correctly input the designated data when applying the formula memory operation mode, for example, when entering a triangular function, the operator should merely depress "SIN" key instead of sequentially depressing keys "S", "I", and "N".

The present invention provides such a calculator that executes any designated operations according to the pre-determined sequence by using different formulas. Specifically, the calculator comprises means for selecting modes that selects and designates either the sequential operation mode that sequentially calculates said different formulas according to individual key operations, or formula memory operation mode that executes operations according to the preferred order of said operations after entry of said sequential operation mode, and another means for executing operations in accordance with operational sequence corresponding to said mode select means being designated.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
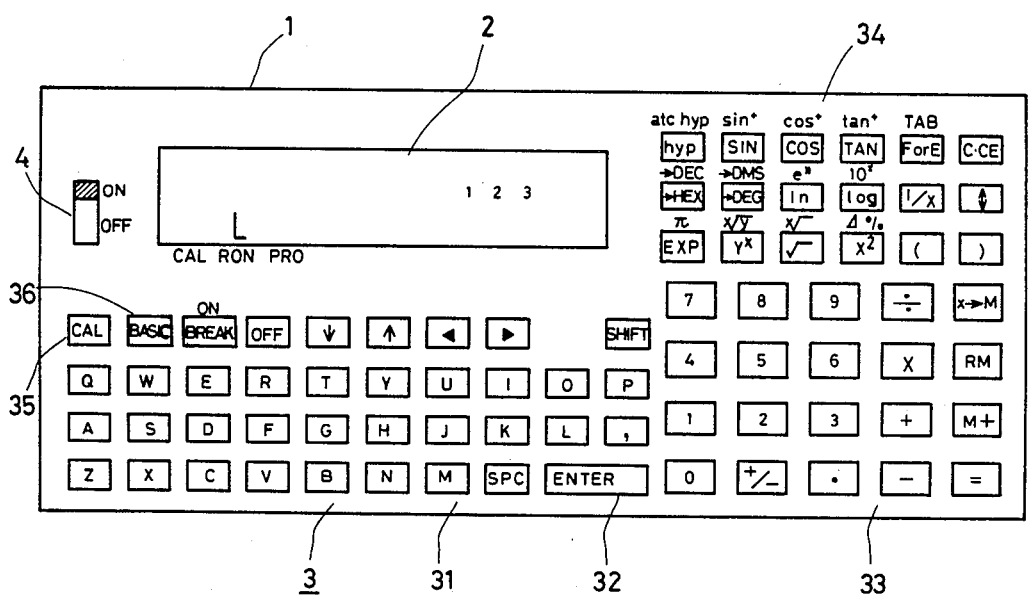
FIG. 1 is an external view of a calculator incorporating a preferred embodiment of the present invention.

FIG. 1 is an external view of a calculator as a preferred embodiment of the present invention. Reference number 1 is the main unit. Reference 2 is a multi-digit display comprising LCD. Reference 3 is the key input unit. In particular, reference number 31 shows character keys, 32 the ENTER key that activates execution of operations.

After completing entry of all the designated formulas, the formula memory operation is executed by depressing the ENTER key in order that the results of operations can be read from the multi-digit display unit. Reference number 33 shows a group of numerical keys including digits 0 through 9 and decimal-point key, whereas reference number 34 is a group of functional keys. Reference number 35 is the mode designation key CAL that designates the sequential operation mode. Reference 36 is the other mode designation key BASIC that designates the formula memory operation mode. Reference number 4 is the power switch.

Figure 2:
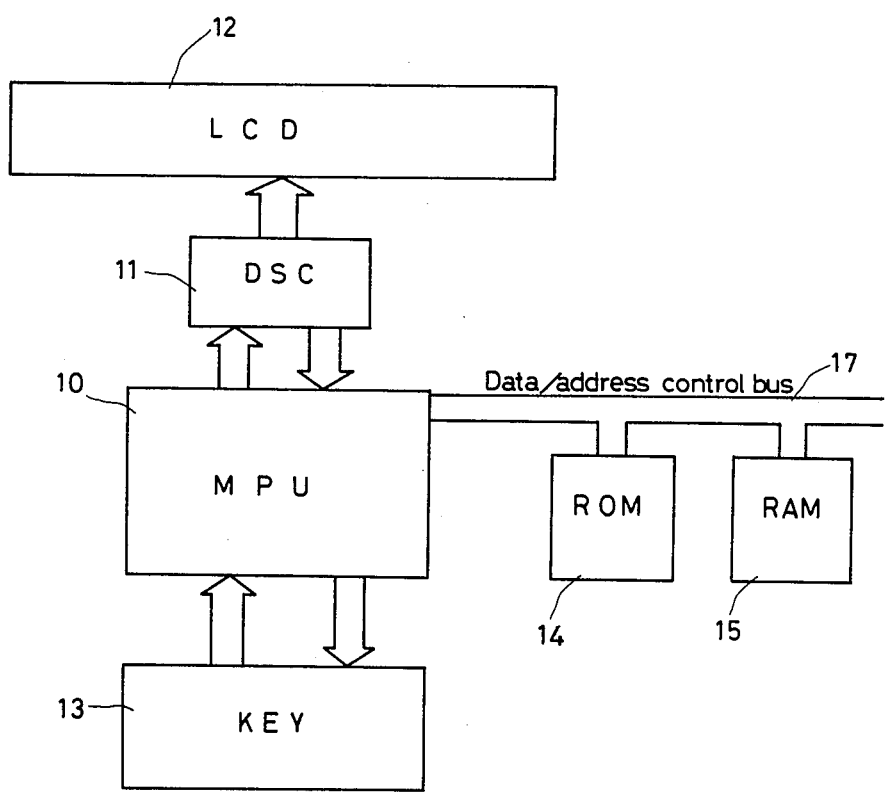
FIG. 2 is a simplified schematic diagram of said calculator incorporating a preferred embodiment of the present invention.
Figure 3:
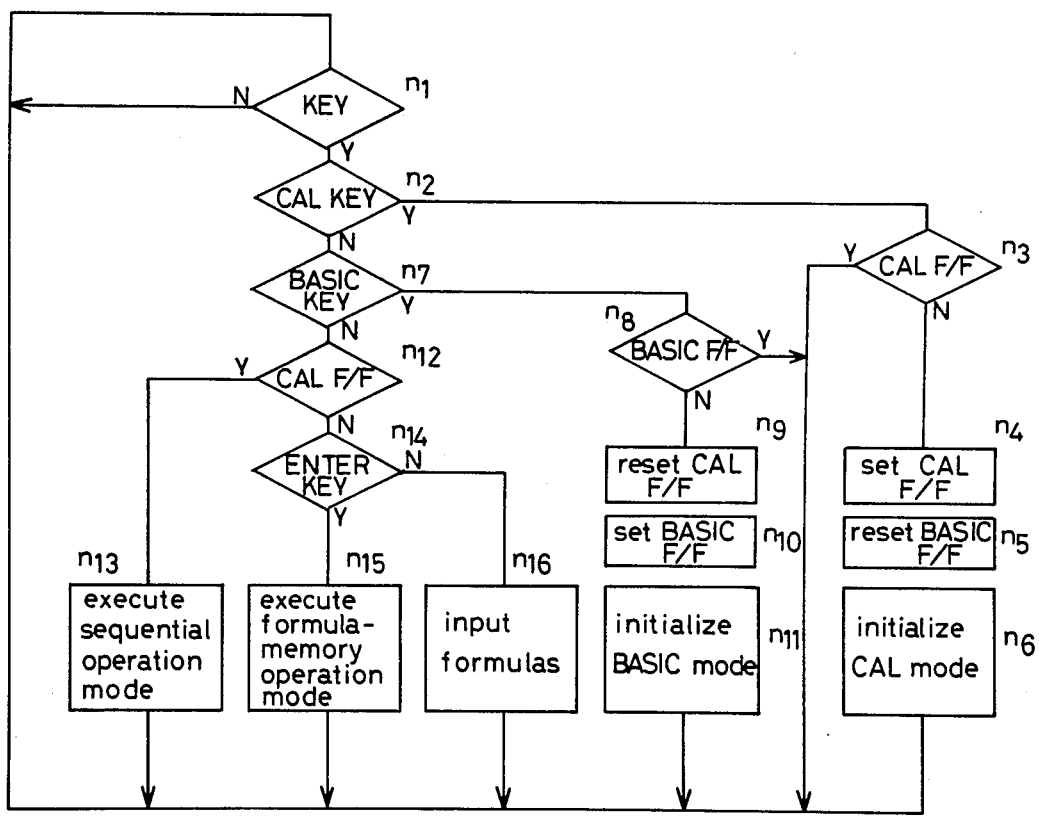
FIG. 3 is a flowchart describing the system operation of said calculator.

FIG. 2 is a simplified schematic diagram of a calculator incorporating a preferred embodiment of the present invention. System operations are described by the flowchart shown in FIG. 3. In FIG. 3, reference number 12 is a display unit, for example, such as the one composed of LCD, which controls illumination of either the character display or symbol segments via the display drive circuit 11. Reference number 13 is the key input unit. I/O port of the microprocessor 10 judges whether any keys have been activated, or not. Reference number 14 is a read-only memory ROM, in which, interpreter, functional sub-routines, and other control programs necessary for executing a variety of programs are stored. Reference number 15 is a read-write memory RAM which makes up a variety of flags and registers, while storing a variety of programs. Reference number 10 is a microprocessor that fully controls the key input 13, display drive circuit 11, ROM 14 and RAM 15, and executes operations of the programmed functions. Reference number 17 is the data address control bus. In reference to the operational flowchart of FIG. 3, system operations are described below.

First, step n1 identifies the key input operation, i.e., it identifies whether any of the designated keys has been input, or not. If any key has been operated, such a key code, for example, an 8-bit data is written into a specific area of RAM 15. If no key is pressed, step n1 repeats identifying said key input operation. Kinds of keys in operation are identified by referring to the key code contents stored by RAM. Next, step n2 identifies whether CAL key that designates the sequential operation mode has been activated, or not. If flip flop that identifies the CAL mode is not yet set, step n4 will be activated by passing step n3 so that said flip flop can be activated. This resets the BASIC flip flop (step n5), thus initializing the CAL mode in step n6. In other words, upon entry of the mode-designate key CAL 35, such a CAL mode operation is executed by sequential operations activated by steps n1 through n6. When said CAL mode is initialized by step n6, all the contents of flags and key input applied to the BASIC mode i.e., the formula memory format arithmetic operation, are cleared, and simultaneously all the contents of flags and registers used for the CAL mode are initialized.

Next, as soon as the BASIC key designating the formula memory operation mode is activated without depressing the CAL key during steps n2 and n7, the microprocessor then identifies whether the BASIC flip flop has been set, or not. If not, it resets the CAL flip flop, thus setting the BASIC flip flop, and then initializes the BASIC mode operation during steps n8 through n11. In other words, the BASIC mode can be set by operating the BASIC key 36 during steps n1, n2, and n7 through n11. As soon as the BASIC mode operation has been initialized by step n11, all the contents of flags and registers used for the CAL mode will be cleared, and simultaneously, such flags and key input buffers used for the BASIC mode will be initialized. Steps n2 and n7 respectively identify whether the activated 8-bit code data is exactly identical to the one that is designated by either the CAL or BASIC key. Step n12 determines if CAL flip flop is set. If the sequential operation mode remains, step n13 will be activated to execute the designated operations by sequentially displaying the interim results whenever such relevant keys are operated.

Conversely, as soon as the ENTER key (execution key) 32 is activated during step n14 without setting CAL flip flop, the microprocessor then identifies that the formula memory operation mode is entered, thus causing all the designated formulas to be input, followed by execution of operations by entry of the ENTER key 32, and the results of operations are finally displayed. These operations can be executed in accordance with the predetermined preference orders. If the ENTER key is not operated, step proceeds from n14 to n16, where the designated formula are sequentially stored in specific areas of RAM 15 according to the order in which the keys are pressed. During execution of these operations via steps n13 and n15, despite different means for controlling the preference orders against the designated operations, functions and other operational sub-routines can be commonly controlled.

Conventionally, electronic calculators including the functional calculators display a variety of data by using the decimal notation. These calculators usually incorporate such functions, for example, displaying data in the binary, octal, or hexadecimal notations. On the other hand, a specific device should be implemented in order to correctly identify such a specific data being displayed.

Figure 4:
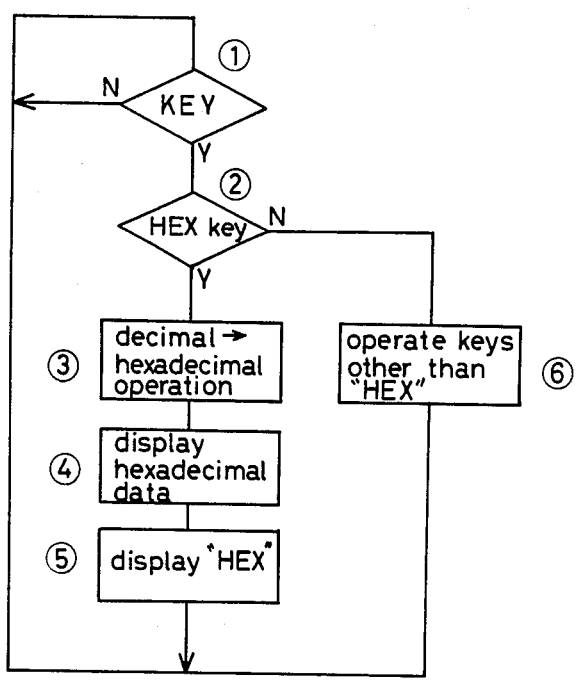
FIG. 4 is also the other flowchart describing the system operation of said calculator.
Figure 5A:
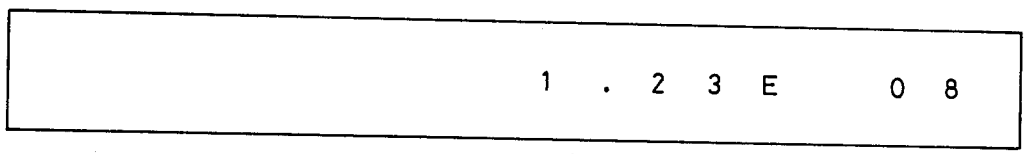
FIG. 5 (a) and (b) respectively show typical examples of the display.
Figure 5B:
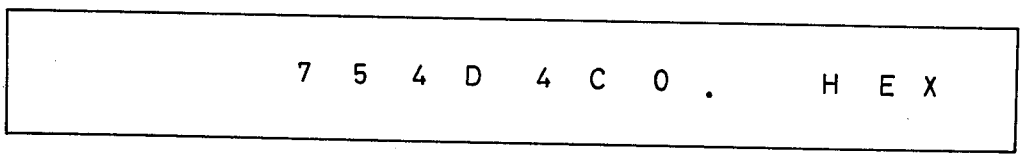

In a preferred embodiment of the present invention, when keys are sequentially depressed in order of 1 2 3 EXP and 8, display unit 1 will show these digits and character E as shown in FIG. 5 (a). These designate a formula $1.23 \times 10^8$, in which index 8 is denoted as "08" to the right of the display unit. Now, in order to display these in the hexadecimal notation,—HEX key should be operated. By depressing this key, specific operations are activated in accordance with the flowchart shown in FIG. 4.

These operations are sequentially executed in the following orders. First, the microprocessor identifies whether any designated keys are input, or not. If entry of any key is identified, the key code composed of an 8-bit data is then stored into a specific area of RAM, and then the microprocessor correctly identifies the operated keys in reference to the stored key code data during steps (1) and (2) shown in FIG. 4.

If—HEX key has been identified, the mocroprocessor then converts said decimal data ($1.23 \times 10^8$) into the hexadecimal data (754D4C0), which is then decoded. The decoded data is then delivered to the display controller DSC before being displayed in the display unit. Simultaneously, "HEX" is displayed for designating the presence of the hexadecimal data in the display. These operations are represented by steps (3), (4), and (5) of FIG. 4. Designation of "HEX" mode is shown in FIG. 5 (b). This "HEX" designation system conveniently eliminates such a display unit which is otherwise necessary for designating the "HEX" mode in addition, and yet, character data "HEX" can be displayed in a large size enough to allow the operator to easily identify it.

In reference to the flowchart of FIG. 4, if—HEX key is not operated, operation mode will directly proceed from step 2 to 6, enabling the operator to correctly execute any designated operations according to the key operations thus entered.

The preferred embodiment of the present invention has been thus described typically in reference to the display system calculators. It should be understood however that the present invention can also be applied to the printer system calculators and other types of calculators as well. The preferred embodiment of the present invention may use switches, slide switches, and other mode designating means in place of said mode-designate keys. In addition, since such a calculator incorporating a preferred embodiment of the present invention provides means for using character keys and functional keys in combination, such functional keys, for example, SIN, COS, and others, can also be individually used in the BASIC mode, thus eventually minimizing the finger key input operations to provide faster and easier key operations.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A calculator for executing formula calculations according to a selected operational sequence, said calculator comprising:

input keys for inputting data into said calculator according to individual key operations;

means for selecting modes under which a plurality of said input keys can be operated, said means for selecting modes comprising a sequential operational key for activating a sequential operational mode and a formula memory operational key for activating a formula memory operational mode, each said mode being capable of having different operational sequences, one of said keys of said means for selecting being actuated before a plurality of said input keys are actuated;

means for executing operations in response to actuation of one of said keys of said means for selecting, said means for executing performing operations in accordance with operational sequences corresponding to the actuated key of the means for selecting; and said formula memory operational mode calculating said formulas according to an actuation sequence of said individual key operations according to a preference order of said operations after input of said individual key operations, said preference order being capable of calculating said formulas in a sequence different from said actuation sequence.

2. The calculator according to claim 1, wherein said means for executing further includes means for determining the operational sequences and for identifying selected ones of said operational sequences and wherein said means for executing outputs results of executed calculations and wherein said calculator further includes display means for displaying at least one of the data input into said calculator, results from said means for executing and an indicator for showing when one of said selected operational sequences is chosen.

* * * * *